United States Patent [19]
Hollnagel

[11] Patent Number: 5,803,512
[45] Date of Patent: Sep. 8, 1998

[54] TUBE QUICK CONNECT TO FEMALE SOCKET

[76] Inventor: Harold E. Hollnagel, 9479 N. Riverbend Ct., Milwaukee, Wis. 53217

[21] Appl. No.: 911,540

[22] Filed: Aug. 14, 1997

Related U.S. Application Data

[63] Continuation-in-part of Ser. No. 621,110, Mar. 22, 1996, Pat. No. 5,718,463.

[51] Int. Cl.$^6$ .............................. F16L 37/12; F16L 39/00
[52] U.S. Cl. .......................... 285/319; 285/921; 285/424
[58] Field of Search .................................. 285/319, 320, 285/921, 424, 317

[56] References Cited

U.S. PATENT DOCUMENTS

| | | |
|---|---|---|
| 3,711,125 | 1/1973 | Dehar . |
| 3,826,523 | 7/1974 | Eschbaugh . |
| 4,036,515 | 7/1977 | Karcher et al. ..................... 285/319 X |
| 4,681,351 | 7/1987 | Bartholomew ......................... 285/319 |
| 4,778,203 | 10/1988 | Bartholomew ...................... 285/319 X |
| 5,718,463 | 2/1998 | Hollnagel ................................ 285/319 |

Primary Examiner—Heather Shackelford
Attorney, Agent, or Firm—Howard & Howard

[57] ABSTRACT

A quick connect member for coupling a tube 34 to a socket member 12 is characterized by arms extending axially from a support portion 44 through a flared length 54 slanting radially outwardly and axially rearwardly immediately from the radial plane at the forward extremity to an abutment 48 with a tip 50 at the radially outward extremity and a trough 52 at the radially inward extremity. Thereafter, each of the arms includes a lever length 56 extending from the trough 52 radially upwardly and outwardly and finger 58 extending axially from the lever length 56. In one instance, the lever length 56 of each of the arms is disposed in the space provided by a conical relief 20 in the entry end of the socket member 12 whereas the flared length 54 is disposed in the space provided by a conical surface 28. There is a first radius between the support portion 44 and the flared length 54 and a second radius defining the tip 50 and the first radius is larger than the second radius. In another instance, the support portion 44 is spaced axially from the forward extremity 64 by the connector lengths 62.

17 Claims, 3 Drawing Sheets

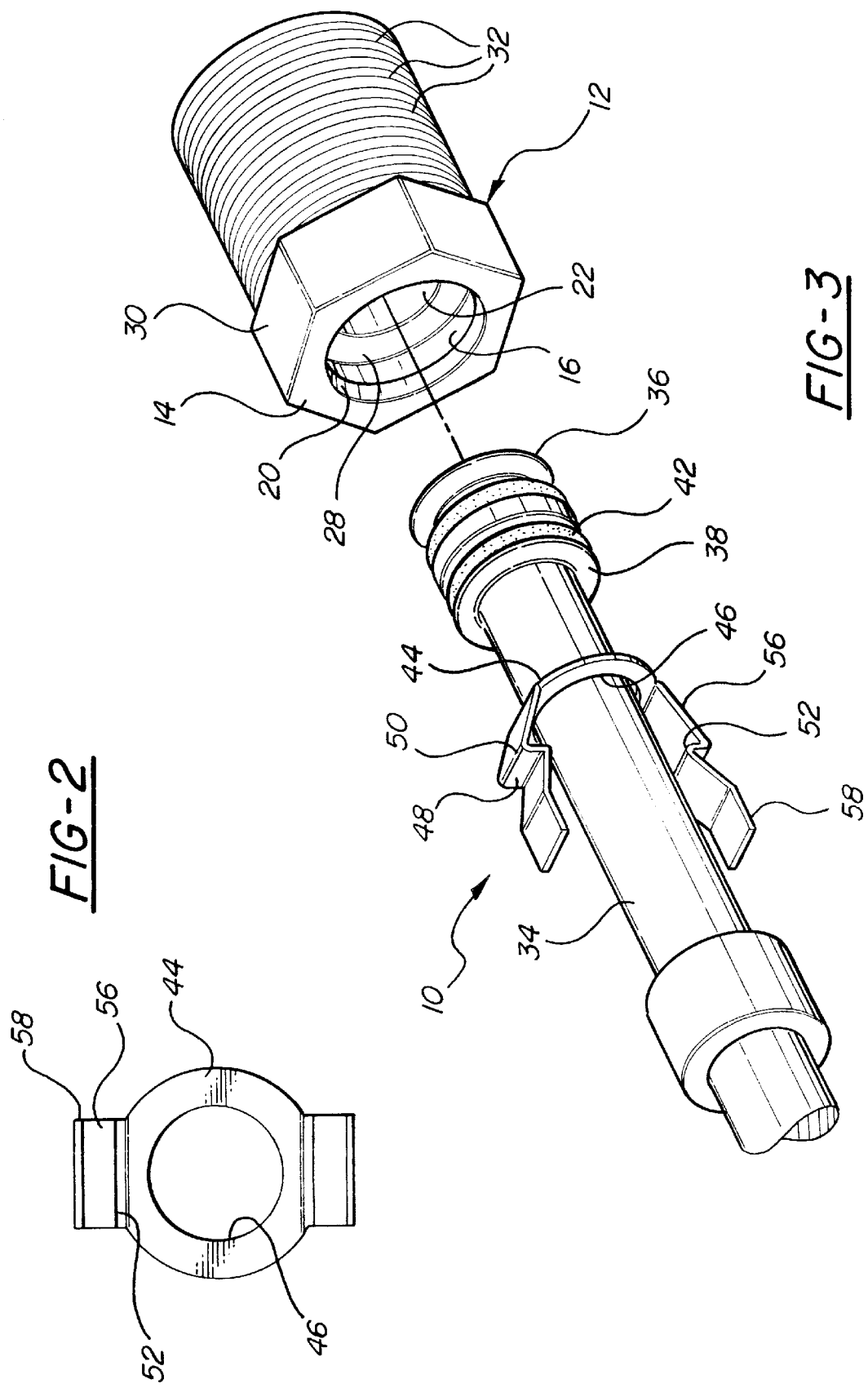

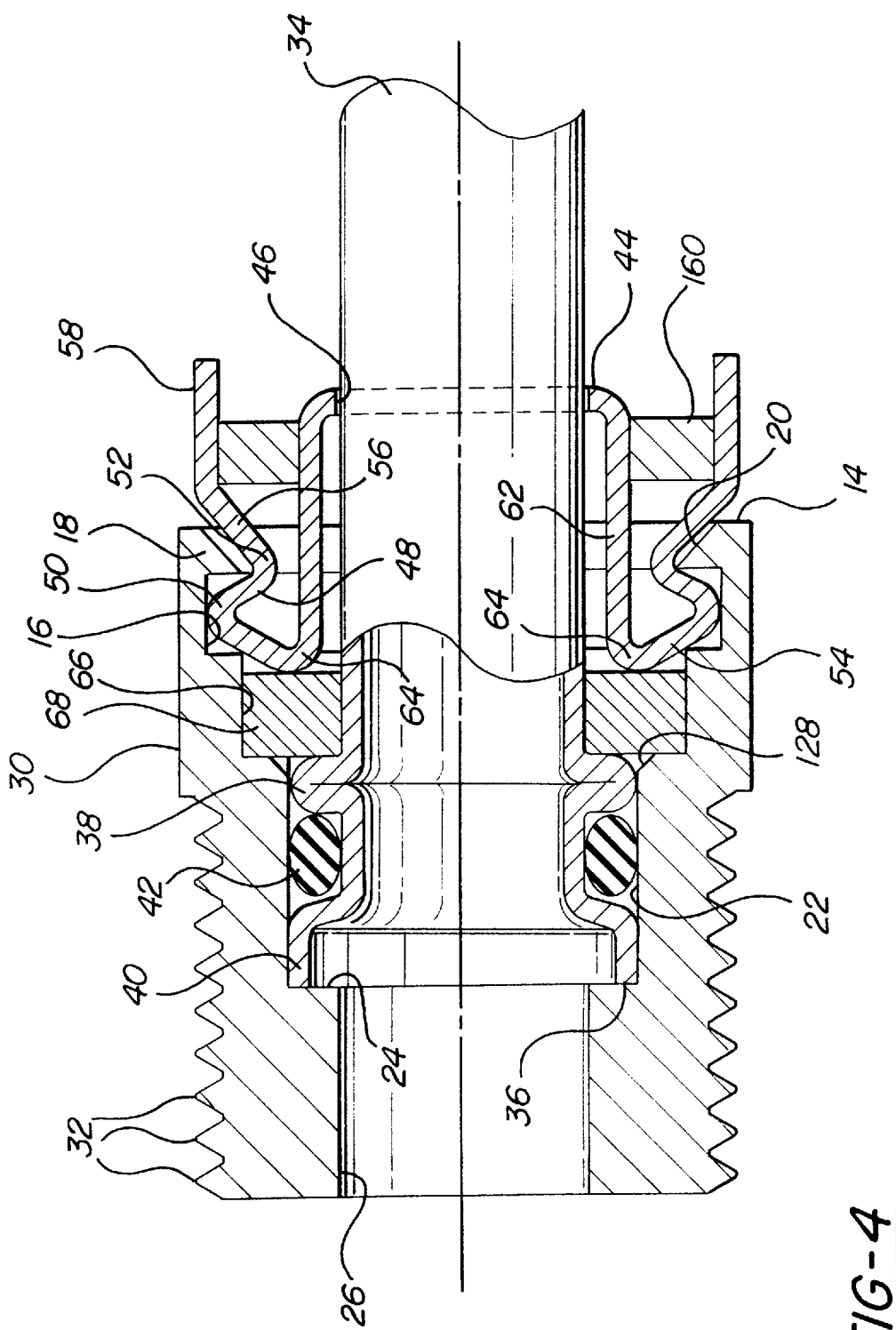

TUBE QUICK CONNECT TO FEMALE SOCKET

RELATED APPLICATION

This application is a continuation-in-part of application Ser. No. 08/621,110 filed Mar. 22, 1996 now U.S. Pat. No. 5,718,463 issued Feb. 17, 1998.

BACKGROUND OF THE INVENTION

1. Field of the Invention

The subject invention relates to a quick connect assembly for connecting a fluid conveying tube in a female socket in a member in fluid communication with the tube.

2. Description of the Prior Art

The art of coupling or connecting a fluid tube to a female socket or receptacle is highly developed and therefore includes a wide variety of assemblies. There is, however, a constant need to simplify the assembly and the manufacturing time and expense and to provide alternative constructions. Examples of such assemblies are disclosed in U.S. Pat. 3,711,125 to Dehar and U.S. Pat. No. 3,826,523 to Eschbaugh. The Dehar assembly, in addition to bending of metal to form the quick connect member, also requires a secondary piercing operation in the arms and a specially shaped seal between the end of the tube and the socket. The Eschbaugh assembly requires a relatively close tolerance fit between the quick connect member and the interior of the socket and relatively long arms requiring more metal.

SUMMARY OF THE INVENTION AND ADVANTAGES

A tube quick connect assembly comprising a socket member defining a female socket which presents a radially extending shoulder. A tube has an end disposed in the socket and presents a radially extending projection. A quick connect member has a support portion surrounding the tube and in sliding engagement with the tube. The quick connect member includes a pair of arms with each arm extending axially along the tube from the support portion to an abutment biased radially outwardly into a locked position in radial overlapping engagement with the shoulder and moveable radially inwardly to a release position wherein the abutment clears the shoulder to axially remove the quick connect member from the socket. The quick connect member is characterized by the abutment having a tip at the radially outward extremity and a trough at the radially inward extremity and presenting a forward extremity for applying a retention force to the projection in a radial plane with each of the arms including a flared length slanting radially outwardly and axially rearwardly immediately from the radial plane at the forward extremity to the tip and then extending downwardly through the abutment to the trough. Each of the arms includes a lever length extending from the trough radially upwardly and outwardly and finger extending axially from the lever length.

Accordingly, the subject invention provides a very specific quick connect assembly with a very specific connector member shape which is easily fabricated of a minimum of material by bending without a secondary piercing operation and which uses off-the-shelf seals to avoid very close tolerances.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 is an end view of the quick connect member of FIG. 1;

FIG. 3 is an exploded perspective view of the embodiment of FIG. 1; and

FIG. 4 is a fragmentary cross sectional view of a second preferred embodiment of the subject invention.

DETAILED DESCRIPTION OF THE PREFERRED EMBODIMENT

Figure 1:
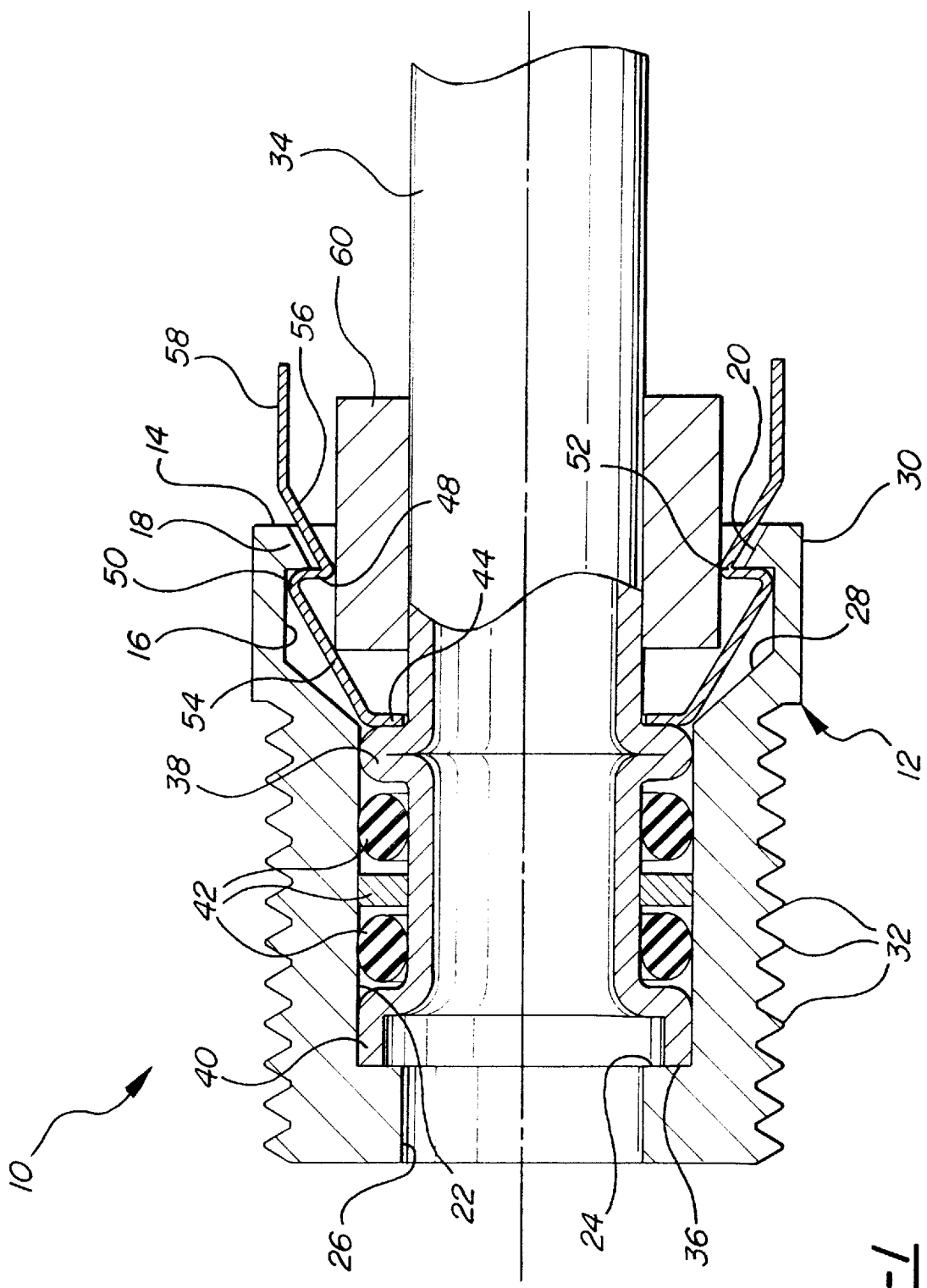
FIG. 1 is a fragmentary cross sectional view of a first preferred embodiment of the subject invention.

Referring to the Figures, wherein like numerals indicate like or corresponding parts throughout the several views, a first embodiment of a tube quick connect assembly is generally shown at 10 in FIGS. 1 through 3.

The assembly 10 comprises a socket member generally indicated at 12 and defining a female socket. More specifically, the socket member 12 has an entry end 14 and an annular groove 16 is disposed adjacent the entry end 14 to define an inwardly extending annular flange 18. The flange 18 presents a conical relief 20. In other words, the inwardly extending radial flange 18 terminates in a tapered or conical relief 20. The inwardly extending annular flange 18 and the groove 16 define a radially extending shoulder. The socket member 12 includes a tube counterbore 22 presenting a radial tube seat 24 adjacent a bore 26 in the male end of the socket member 12. The shoulder is therefore defined by the annular groove 16 in the socket member 12 and is of a larger diameter than the counterbore 22.

The socket member 12 also presents a conical surface 28 extending between the counterbore 22 and the annular groove 16. The socket member 12 includes a hexagonal head 30 disposed about the entry end 14 and a threaded exterior presenting threads 32 extending from the hexagonal head 30 to the male end of the socket member 12.

The socket member 12 establishes fluid communication between a port (not shown) into which it is threaded and a tube 34. The tube 34 has an end 36 disposed in the socket member 12 and presents a radially extending projection 38. The end of the tube 34 is seated against the tube seat 24. More specifically, the end of the tube 34 presents an enlarged end 40 extending radially outwardly coextensively with the projection 38 from the remainder of the tube 34. The radially enlarged end 40 is axially spaced from the projection 38 to define a saddle between the enlarged end 40 and the projection 38, the saddle being of the same diameter as the main portion of the tube 34. The enlarged end 40 and the projection 38 are of a larger diameter and fit snugly, i.e., closely, within the counterbore 22 and a seal 42 is disposed in the saddle to seal the tube 34 with the counterbore 22. In the embodiment of FIGS. 1–3, the seal 42 includes two O-rings made of nitrite elastomer separated by a center O-ring made of a polymer of a different hardness than the two O-rings between which it is sandwiched.

The assembly 10 includes a quick connect member having a support portion 44 having an aperture 46 surrounding the tube 34 and in sliding engagement with the tube 34. The quick connect member includes a pair of arms with each arm extending axially along the tube 34 from the support portion 44 to an abutment 48 biased radially outwardly into a locked position in radial overlapping engagement with the shoulder and moveable radially inwardly to a release position wherein the abutment 48 clears the shoulder to axially remove the quick connect member from the socket. That is, the abutment 48 clears the inner tip of the conical surface 28 of the flange 18 when in the release position.

The quick connect member is characterized by the abutment 48 having a tip 50 at the radially outward extremity and a trough 52 at the radially inward extremity. The quick connect member presents a forward extremity, defined by the support portion 44 which is disposed in the plane of the forward extremity in the embodiment of FIGS. 1–3, for applying a retention force to the projection 38 in a radial plane and each of the arms includes a flared length 54 slanting radially outwardly and axially rearwardly immediately from the radial plane at the forward extremity to the tip 50. Each of the arms extends downwardly from the tip 50 through the abutment 48 to the trough 52. Thereafter, each of the arms includes a lever length 56 extending from the trough 52 radially upwardly and outwardly and finger 58 extending axially from the lever length 56. The lever length 56 of each of the arms is disposed in the space provided by the conical relief 20 whereas the flared length 54 is disposed in the space provided by the conical surface 28. There is a first radius between the support portion 44 and the flared length 54 and a second radius defining the tip 50 and the first radius is larger than the second radius. More specifically, the first radius may be about 0.065 inches while the second radius is about 0.030 inches. Therefore, the first radius is at least twice as large as the second radius.

To enhance security, a blocking element is disposed under the arms for preventing the abutments 48 from moving to the release position. In the embodiment of FIGS. 1–3, the blocking element comprises a ring 60 disposed between the tube 34 and the troughs 52 of the arms. In this manner, the fingers 58 cannot be moved inwardly sufficiently to remove the abutment 48 out of engagement with the flange 18.

The second embodiment of FIG. 4 differs from the that of FIGS. 1–3 only in that the support portion 44 is spaced axially from the plane of the forward extremity and each of the arms includes a connector length 62 extending between the support portion 44 and the forward extremity. In this case, the forward extremity is defined by the bend 64 of more than ninety degrees from the flared length 54 to the connector length 62.

Another difference in FIG. 4 is that a blocking element or ring 160 is disposed between the fingers 58 and the connector lengths 62 for preventing the abutments 48 from moving to the release position.

Further, the socket member 12 includes an intermediate bore 66 having a diameter larger than the counterbore 22 and smaller than the annular groove 16 with a spacer ring 68 being disposed in the intermediate bore 66. The spacer ring 68 is disposed between the projection 38 and the forward extremity 64 for transmitting forces from the forward extremity 64 to the projection 38.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A tube quick connect assembly (10) comprising;
a socket member (12) defining a female socket,
a tube (34) having a forward end disposed in said socket member (12) and presenting a radially extending projection (38) disposed rearwardly of said forward end,
said socket member (12) presenting a radially extending shoulder,
a quick connect member having a support portion (44) surrounding said tube (34) and in sliding engagement with said tube (34) and including a pair of arms with each arm extending axially along said tube (34) from said support portion (44) to an abutment (48) biased radially outwardly into a locked position in radial overlapping engagement with said shoulder and moveable radially inwardly to a release position wherein said abutment (48) clears said shoulder to axially remove said quick connect member from said socket,
said quick connect member characterized by said abutment (48) having a tip (50) at the radially outward extremity and a trough (52) at the radially inward extremity, said quick connect member presenting a forward extremity which applies a retention force to said projection (38) in a radial plane and rearwardly of said projection, each of said arms including a flared length (54) slanting radially outwardly and axially rearwardly immediately from said radial plane at said forward extremity to said tip (50), each of said arms extending radially inwardly through said abutment (48) to said trough (52), each of said arms including a lever length (56) extending from said trough (52) radially outwardly and axially rearwardly to a finger (58) extending axially from said lever length (56).

2. An assembly as set forth in claim 1 including a blocking element (60, 160) disposed under said arms for preventing said abutments (48) from moving to said release position.

3. An assembly as set forth in claim 2 wherein said blocking element comprises a ring (60) disposed between said tube (34) and said troughs (52) of said arms.

4. An assembly as set forth in claim 1 wherein said support portion (44) is disposed in said plane of said forward extremity.

5. An assembly as set forth in claim 4 including a first radius between said support portion (44) and said flared length (54) and a second radius defining said tip (50), said first radius being larger than said second radius.

6. An assembly as set forth in claim 5 wherein said first radius is at least twice as large as said second radius.

7. An assembly as set forth in claim 1 wherein said support portion (44) is spaced axially from said plane of said forward extremity and each of said arms includes a connector length (62) extending between said support portion (44) and said forward extremity.

8. An assembly as set forth in claim 7 including a blocking element (160) disposed between said fingers (58) and said connector lengths (62) for preventing said abutments (48) from moving to said release position.

9. An assembly as set forth in claim 1 wherein said socket member (12) includes a tube counterbore (22) presenting a radial tube seat (24) and said end of said tube (34) is seated against said tube seat (24).

10. An assembly as set forth in claim 9 wherein said end of said tube (34) presents an enlarged end (40) extending radially outwardly and space axially from said projection (38), said enlarged end (40) extending to an axial free end (36) of said tube (34) to define a saddle between said enlarged end (40) and said projection (38).

11. An assembly as set forth in claim 10 wherein said enlarged end (40) and said projection (38) fit snugly within said counterbore (22) and including a seal (42) disposed in said saddle to seal said tube (34) with said counterbore (22).

12. An assembly as set forth in claim 11 wherein said shoulder is defined by an annular groove (16) in said socket member (12) which is larger in diameter than said counterbore (22).

13. An assembly as set forth in claim 11 wherein said socket member (12) presents a radially inwardly extending annular flange (18) at an entry end (14) and said annular groove (16) is disposed adjacent said entry end (14), said flange (18) presenting a conical relief (20), said lever length (56) of each of said arms being disposed in the space provided by said conical relief (20).

14. An assembly as set forth in claim 13 wherein said socket member (12) presents a conical surface (28) extending between said counterbore (22) and said annular groove (16), said flared length (54) being disposed in the space provided by said conical surface (28).

15. An assembly as set forth in claim 13 wherein said socket member (12) includes a hexagonal head (30) disposed about said entry end (14) and a threaded exterior (32) extending from said hexagonal head (30).

16. An assembly as set forth in claim 1 including a spacer ring (68) disposed between said projection (38) and said forward extremity for transmitting forces from said forward extremity to said projection (38).

17. An assembly as set forth in claim 12 wherein said socket member (12) includes an intermediate bore (66) having a diameter larger than said counterbore (22) and smaller than said annular groove (16), a spacer ring (68) being disposed in said intermediate bore (66) between said projection (38) and said forward extremity for transmitting forces from said forward extremity to said projection.

* * * * *